(12) United States Patent
Pringnitz

(10) Patent No.: US 9,101,095 B2
(45) Date of Patent: Aug. 11, 2015

(54) FOLDABLE-STORABLE POLE SAW

(71) Applicant: Todd Pringnitz, Mount Pleasant, IA (US)

(72) Inventor: Todd Pringnitz, Mount Pleasant, IA (US)

(*) Notice: Subject to any disclaimer, the term of this patent is extended or adjusted under 35 U.S.C. 154(b) by 171 days.

(21) Appl. No.: 13/633,204

(22) Filed: Oct. 2, 2012

(65) Prior Publication Data

US 2014/0090256 A1   Apr. 3, 2014

(51) Int. Cl.
*A01G 3/08*   (2006.01)
*B27B 21/04*   (2006.01)
*B23D 51/01*   (2006.01)
*B23D 51/03*   (2006.01)

(52) U.S. Cl.
CPC .............. *A01G 3/083* (2013.01); *B23D 51/01* (2013.01); *B23D 51/03* (2013.01); *B27B 21/04* (2013.01)

(58) Field of Classification Search
CPC .. B26B 1/02–1/048; A01G 3/08; A01G 3/083
USPC ........ 30/153, 155–161, 296.1, 510, 514, 517, 30/312, 276
See application file for complete search history.

(56) References Cited

U.S. PATENT DOCUMENTS

| | | | | |
|---|---|---|---|---|
| 1,797,589 A * | 3/1931 | Price | | 30/331 |
| 2,593,323 A * | 4/1952 | Magnussen et al. | | 30/512 |
| 4,167,811 A * | 9/1979 | Barrett | | 30/161 |
| 5,553,386 A | 9/1996 | Hsu | | |
| 5,634,276 A | 6/1997 | Lin | | |
| 5,694,695 A * | 12/1997 | Lund | | 30/296.1 |
| 5,787,536 A * | 8/1998 | Pate | | 7/161 |
| 5,794,345 A * | 8/1998 | Ryon et al. | | 30/144 |
| 6,253,455 B1 * | 7/2001 | Eriksson et al. | | 30/504 |
| 6,298,564 B1 * | 10/2001 | Voser et al. | | 30/512 |
| 6,446,341 B1 * | 9/2002 | Wang et al. | | 30/125 |
| 6,898,858 B1 * | 5/2005 | Spell | | 30/512 |
| 7,017,234 B2 | 3/2006 | Anderson | | |
| 7,958,640 B1 | 6/2011 | Mandriota | | |
| 8,079,151 B2 * | 12/2011 | Chen | | 30/296.1 |
| D664,823 S | 8/2012 | Pringnitz | | |
| 8,266,806 B2 * | 9/2012 | Holmroos | | 30/512 |
| 2002/0194739 A1 * | 12/2002 | Krane et al. | | 30/296.1 |
| 2004/0020062 A1 * | 2/2004 | Ducret | | 30/512 |
| 2006/0048397 A1 * | 3/2006 | King et al. | | 30/296.1 |

* cited by examiner

*Primary Examiner* — Ned Landrum
*Assistant Examiner* — Richard Crosby, Jr.
(74) *Attorney, Agent, or Firm* — Price Heneveld LLP

(57) ABSTRACT

A pole saw includes a long handle with cast end adapter, a cast saw-holding component pivoted to the end adapter for movement between an extended use position and a handle-adjacent storage position, and a saw blade pivoted to the holding component for movement between a blade-use position and a blade-protected position. The end adapter and holding component are cast aluminum for strength and light weight, and are pivoted together about an offset axis so that the blade and blade-holding component are positioned adjacent the handle in a partially protected position that is very compact; thus, no disassembly or separate tools are required. A folding lock mechanism includes a hook and pressure pad that cooperate for secure locking in the extended use position. An adjustable set screw eliminates blade looseness when in the use position.

11 Claims, 6 Drawing Sheets

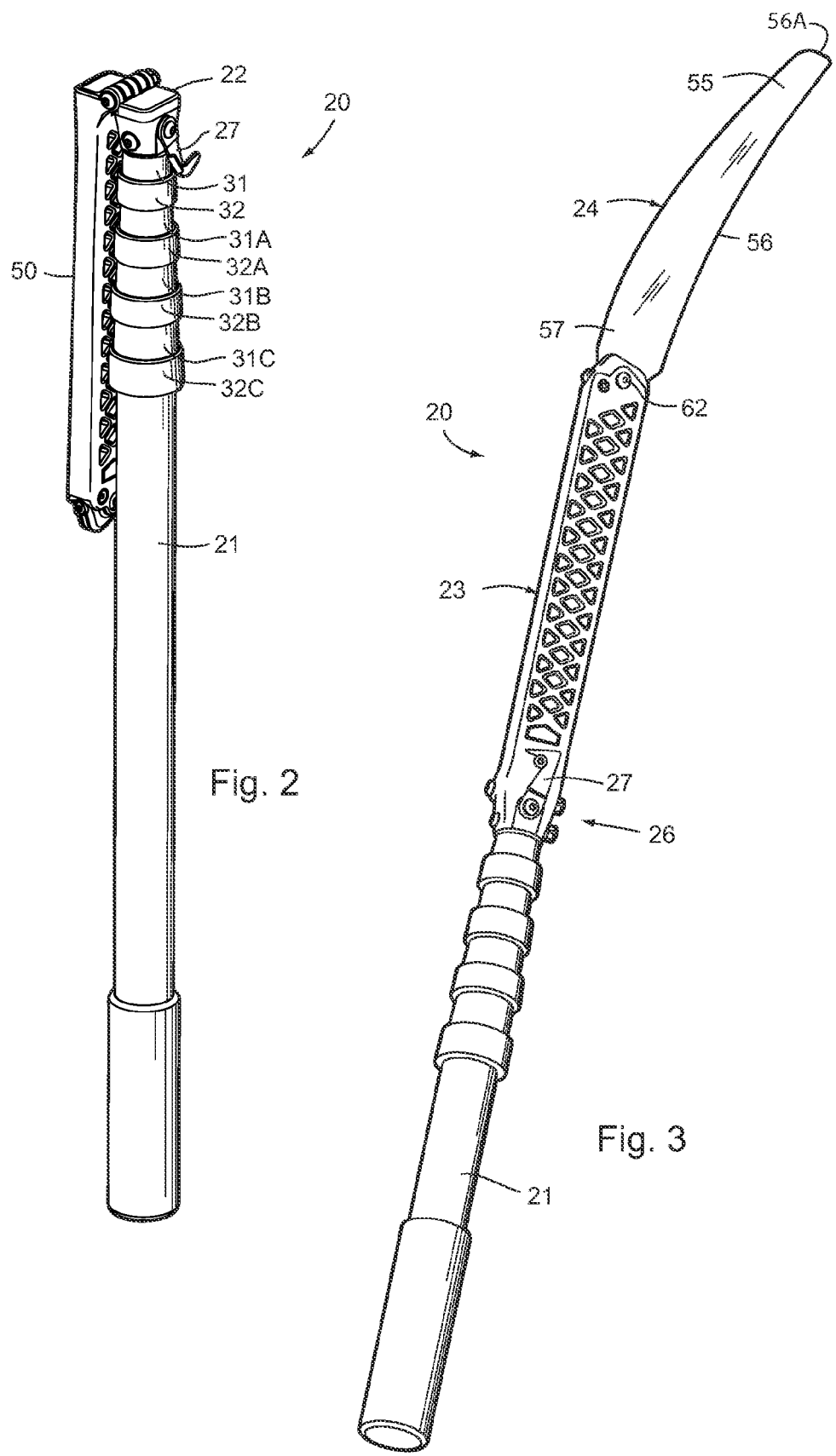

FOLDABLE-STORABLE POLE SAW

BACKGROUND

The present invention relates to pole saws, and more particularly relates to a foldable-collapsible pole saw that is storable in a compact position, yet when expanded is durable and robust.

Pole saws are commonly used to cut tree branches located well above a person's reach. However, known pole saws cannot be folded or collapsed to a blade-protected compact storage position, thus making them difficult for hunters, arborists, and/or gardeners to carry. Pole saws often can be broken down for compact storage. But disassembly risks losing parts, and also takes manual labor, tools and time. Further, disassembly becomes more difficult as components become corroded, worn, and/or damaged. Still further, many pole saws are not easily stored even when broken down.

SUMMARY OF THE PRESENT INVENTION

In one aspect of the present invention, a pole saw apparatus includes a long pole with end adapter, a blade-holding component pivoted to the end adapter for movement between an extended use position and a handle-adjacent storage position, and a saw blade attached to and supported by the blade-holding component.

In a narrower aspect, the end adapter defines a pivot axis offset from and perpendicular to a longitudinal centerline of the long handle.

In a narrower aspect, the saw blade is also pivoted to the saw-holding component for movement between a use position and a blade-protected position.

In another aspect of the present invention, a pole saw apparatus includes a long handle with end adapter, a blade-holding component defining a recess and attached to the end adapter, and a saw blade pivoted to and supported by the blade-holding component for movement between a blade use position and a blade protected position in the recess.

In another aspect of the present invention, a pole saw apparatus includes a long handle with end adapter, a blade-holding component attached to the end adapter, and a saw blade pivoted to and supported by the blade-holding component for movement between a blade use position and a blade protected position.

In another aspect of the present invention, a folding saw includes a handle with end adapter, the handle defining a longitudinal centerline and the end adapter including first apertured flanges defining an offset pivot axis, a blade-holding component including mating flanges pivoted to the aperture flanges for movement between an extended use position and a handle-adjacent storage position, and a locking mechanism including a first part and a second part, the first part being a resilient pad on one of the end adapter and component and an abutting surface of the other of the end adapter and component that engage when in the extended use position, the second part being a hook on one of the end adapter and component and a hook-engaging pin on the other of the end adapter and component that engage when in the extended use position, the resilient pad and the abutting surface providing a resisting force that acts against a retaining force provided by the hook and pin, thus causing friction to more securely retain the component in the extended use position.

In another aspect of the present invention, a folding saw for pruning or cutting high or low branches in a tree includes a blade-holding component defining a recess, a blade with a blade end including a cutting edge, and with a mount end including a pivot hole and an arcuate edge extending partially around the pivot hole, the arcuate edge including at least one indentation, a pivot pin engaging the pivot hole and pivotally mounting the blade to the blade-holding component for movement between an extended use position and a handle-adjacent storage position, a detent engaging the at least one indentation to hold the blade in a selected one of the positions relative to the component, and a set screw threaded into the component, the set screw having a shaft end abutting the edge of the blade when in the extended use position, the set screw being adjustable to eliminate looseness of the blade relative to the blade-holding component when in the selected one position.

An object of the present invention is to provide a foldable pole saw that is durable, robust, and yet simply constructed, so that it can be used by hunters and other out-of-door users in a rugged environment, yet that is collapsible for compact safe storage.

An object of the present invention is to provide a foldable pole saw with blade that can be folded into a protective recess when not in use.

An object of the present invention is to provide a cast blade-holding component having multiple features cast therein, the cast component being lightweight, durable, blade-protecting, and adapted for attachment to a pole.

These and other aspects, objects, and features of the present invention will be understood and appreciated by those skilled in the art upon studying the following specification, claims, and appended drawings.

BRIEF DESCRIPTION OF DRAWINGS

FIGS. 1-2 are front and rear views of a folding pole saw embodying the present invention;

FIGS. 3-4 are front and rear views of the saw from FIG. 1 but expanded for use;

DETAILED DESCRIPTION OF PREFERRED EMBODIMENTS

Figure 1:
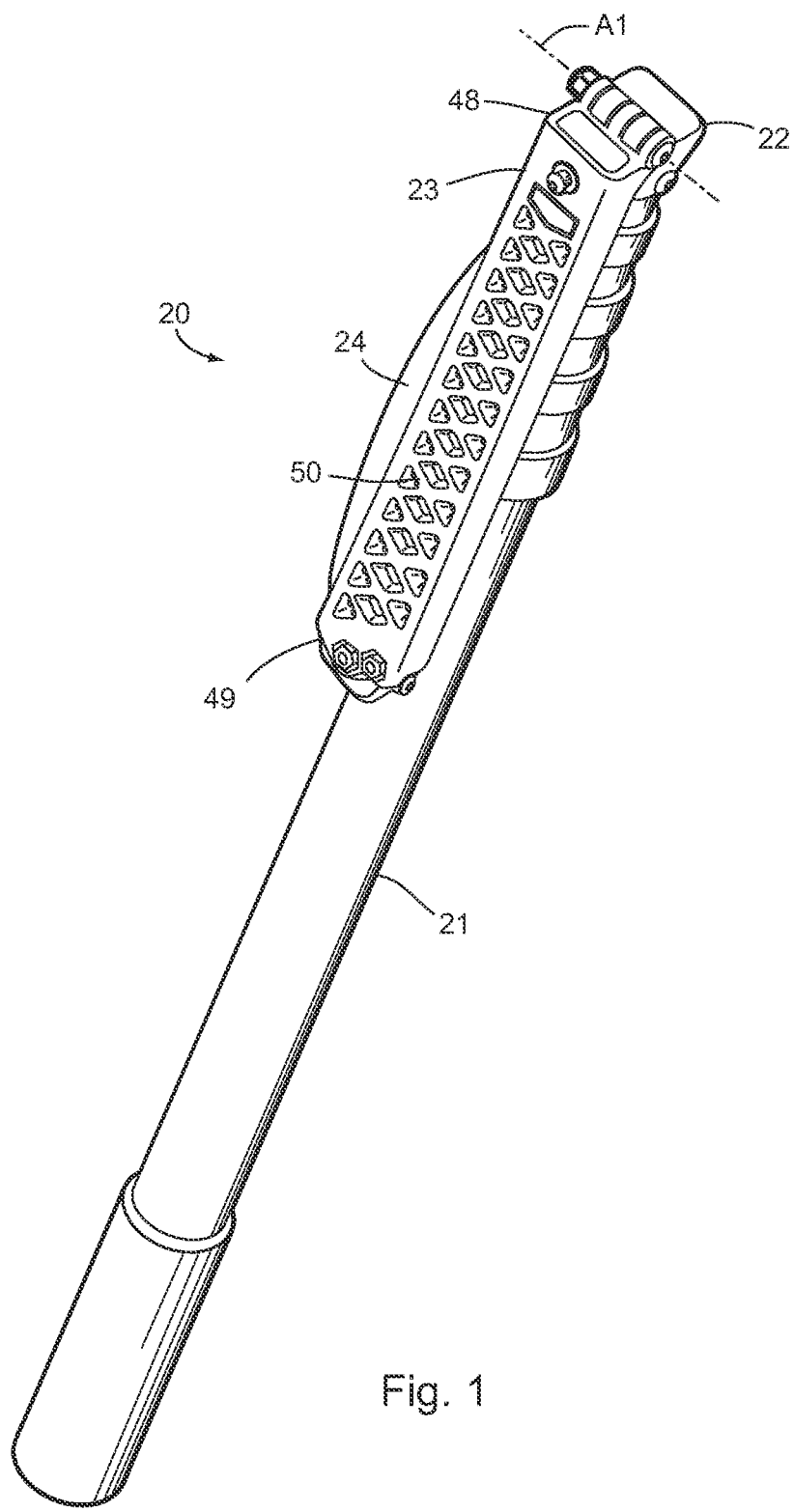
Figure 4:
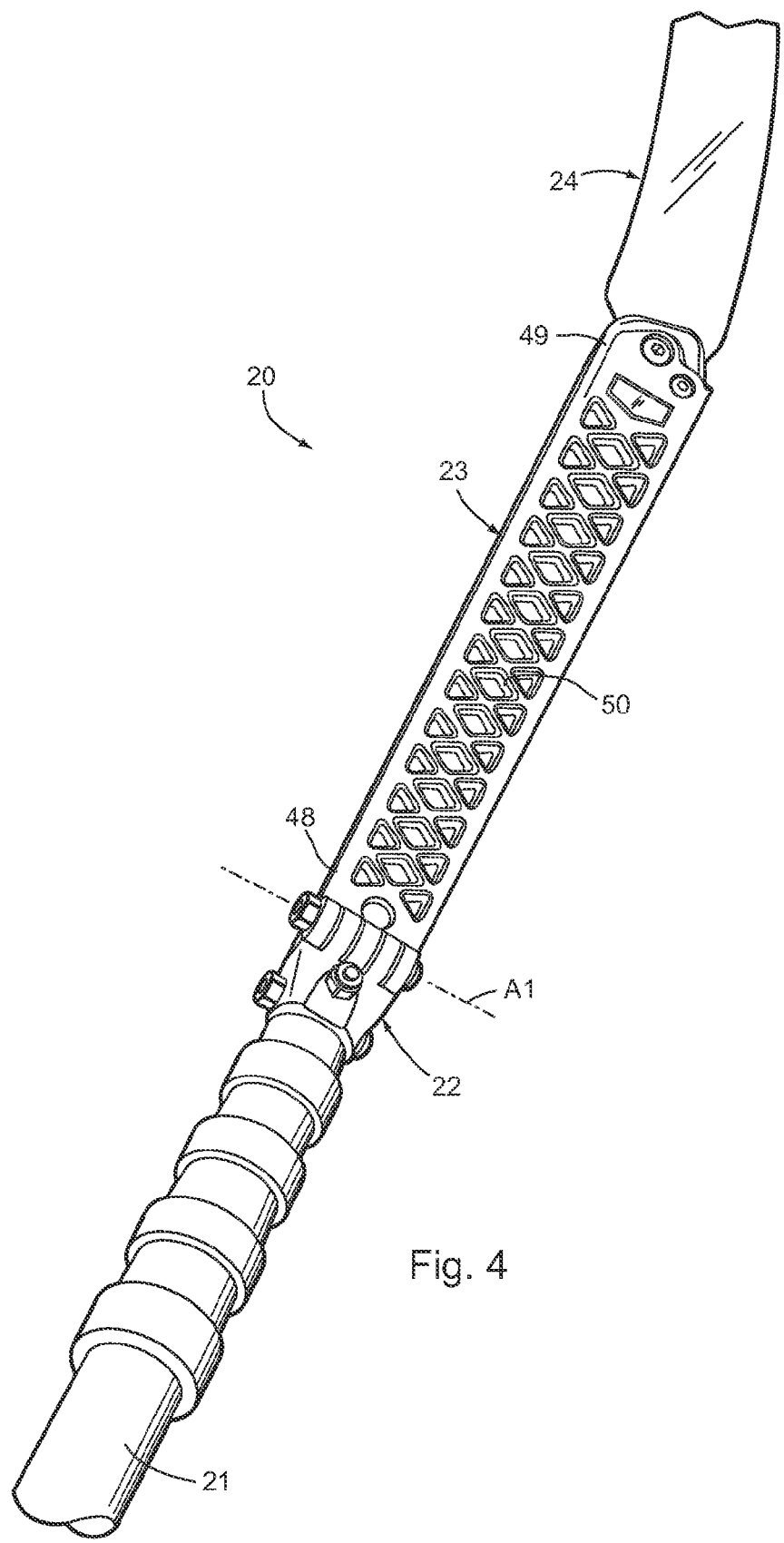

The present pole saw apparatus 20 (FIGS. 1-4) includes a telescopingly-collapsible long handle 21 (also called a "pole" or "elongated handle" herein) with end adapter 22, a saw-blade holding component 23 (cast of aluminum) pivoted on an offset axis to the end adapter 22 for movement between an extended use position and a handle-adjacent storage position, and a blade 24 (also called a "saw blade" herein) pivoted to the holding component 23 for movement between a blade-use position and a blade-protected blade-stored position where the blade 24 is partially in a recess in the component 23. The end adapter 22 and holding component 23 are cast of aluminum for strength, light weight, for multi-function, and to reduce secondary manufacturing operations.

Figure 5:
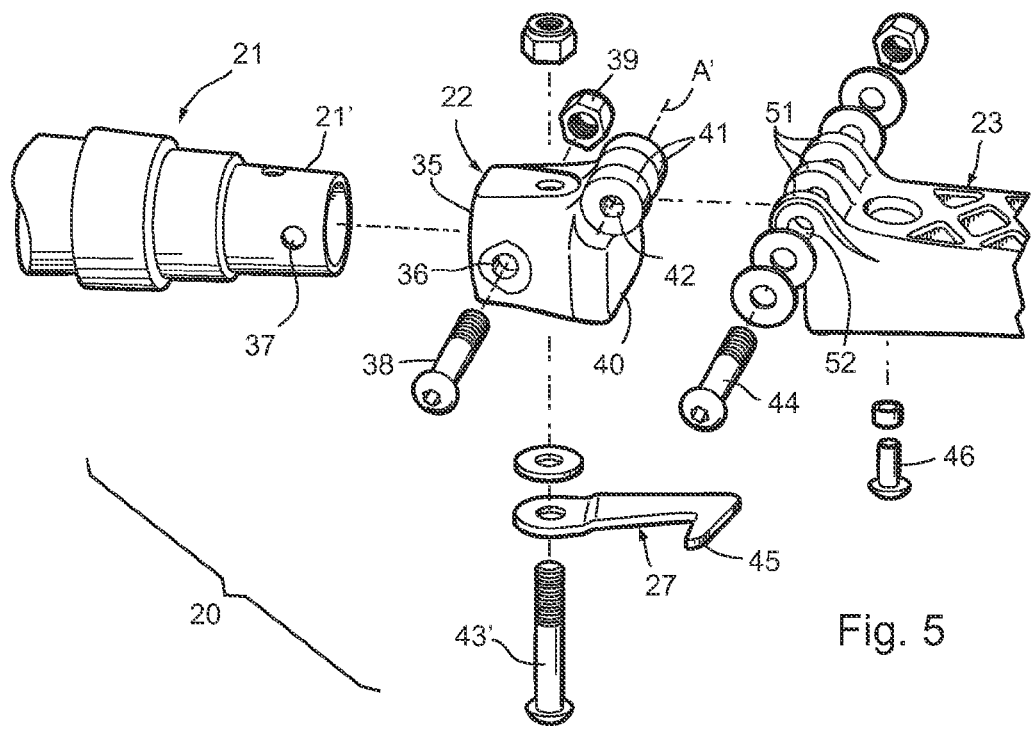
FIGS. 5-6 are exploded views of FIG. 1 showing various components.
Figure 6:
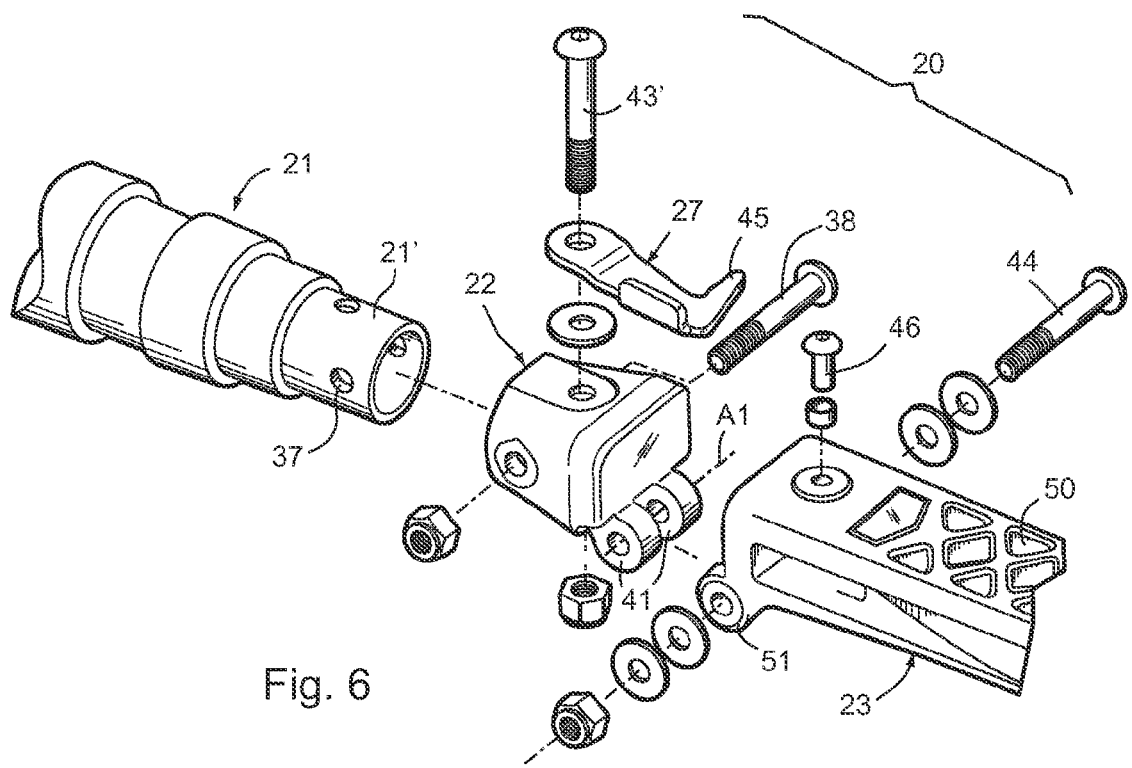
Figure 7:
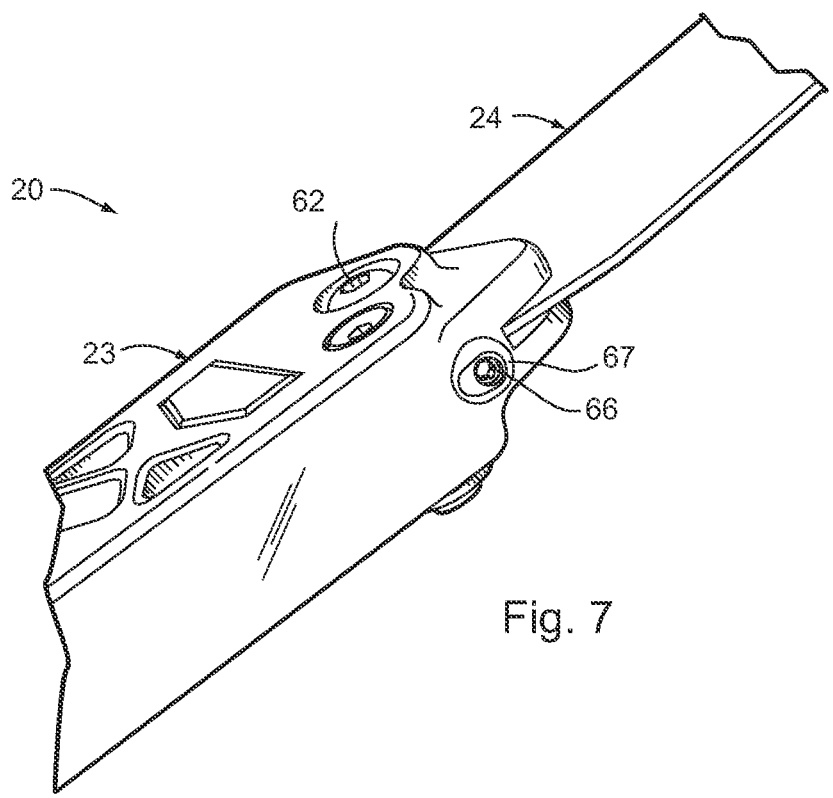
FIG. 7 is a side view of FIG. 1 and showing a blade-tightening set screw.
Figure 8:
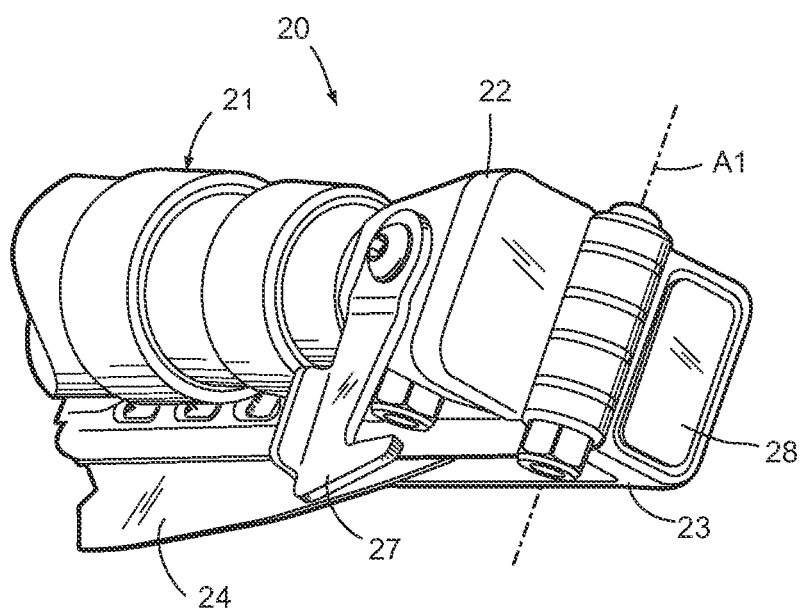
FIG. 8 is an enlarged view of the retainer for holding open the saw blade, the retainer including a hook and pin, and also a resilient compression pad and abutting surface for bias.
Figure 9:
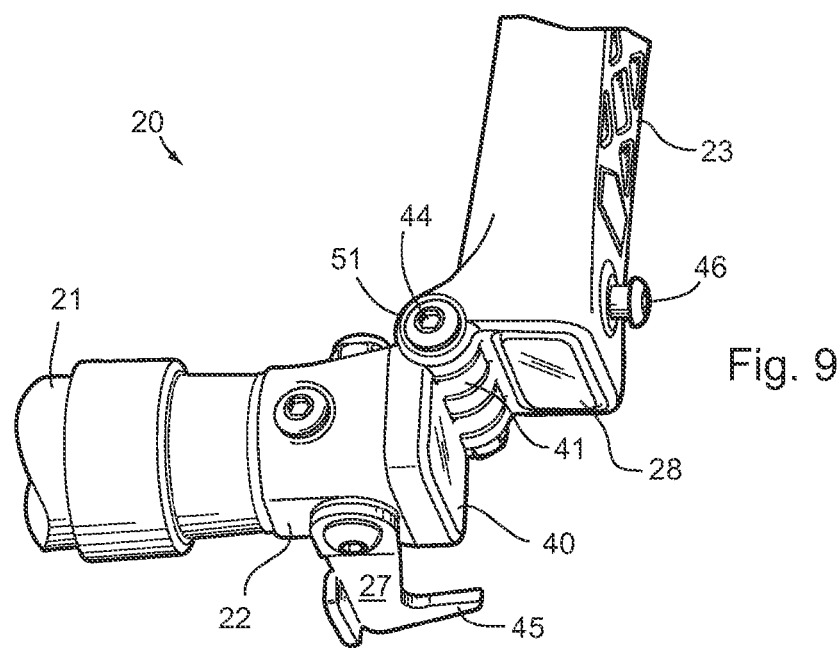
FIGS. 9-10 are partial perspective views showing the folding pole saw in partial open and fully open positions.
Figure 10:
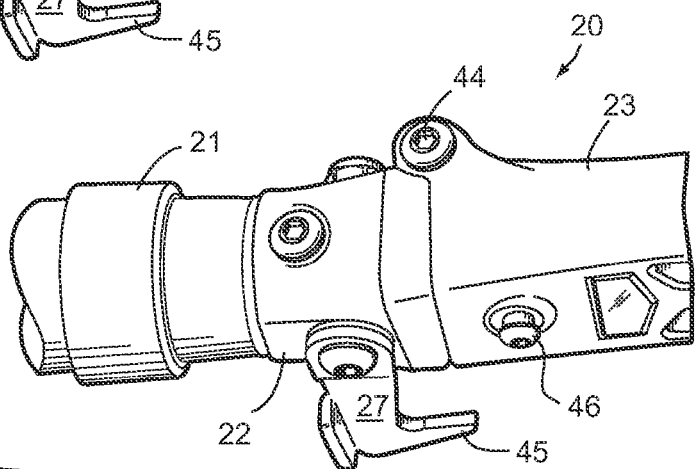

The adapter 22 and component 23 (FIGS. 4-5) define include overlapping aperture flanges defining an offset axis A1 so that the blade 24 and blade-holding component 23 can be folded to a storage position adjacent the handle 21. The storage position places the blade 24 and component 23 in a partially protected position beside the handle, which is also a very compact position for easy storage and handling. Notably, no disassembly or separate tool is required to move the blade 24 between the blade-use position and blade-protected position, nor to move the component 23 between the handle-adjacent storage position and the extended use position. A folding lock mechanism 26 (FIG. 3) includes a hook 27 and biasing pressure pad 28 (FIG. 9) that cooperate with the hinge (flanges 41, 51, pin 44) for secure locking the blade 23 in the extended use position (FIGS. 3-4 and note FIG. 10), as explained below. An adjustable set screw 66 on the saw-holding component 23 eliminates blade looseness when the blade 23 is in the extended use position, such that it provides an improved stability and sense of high quality, which is often important to users.

The pole 21 (FIGS. 1-4) includes telescopingly collapsible tube sections 31-31D and fixing clamps 32-32C that can be rotated to secure the tube sections 31-31D in collapsed or extended positions. Such poles are known in the art, such that a detailed description is not required for a person skilled in this art to understand the present disclosure.

End adapter 22 (FIG. 5) is cast of aluminum, and includes a butt end 35 that receives an end 21' of the pole 21. Holes 36 in the adapter 22 and holes 37 in the pole 21 align for receiving an attachment bolt 38 and nut 39. An opposite end of the illustrated adapter 22 includes a flat surface 40 and offset flanges 41 with apertures 42 that form an offset hinge axis A1 extending parallel the holes 36 and 37. A hook-mounting hole 43 extends through the adapter 22 in a direction perpendicular to the hinge axis A1, and is located about midway on the adapter 22. The hole 43 receives a pin 43' for pivotally mounting the hook 27 to the adapter 22. The hook 27 includes hooked end 45 that is movable from a stored location beside the pole 21 to a locking position where it engages a stud 46 on the component 23.

Saw-holding component 23 (FIG. 1) is cast of aluminum, and includes a pole-attached end 48 and a blade-attached end 49, with a recess-forming body 50 extending therebetween. The body 50 includes opposing side panels and connecting strip that form a recess shaped to receive most (if not all of) the blade 24, including its cutting edge. Also, the side panels of the component 23 include criss-crossing ribs and apertures that both maintain its strength and also lighten its total weight (and also reduce total material). The pole-attached end 48 (FIG. 5) includes a plurality of flanges 51 (three flanges being illustrated) that interfit with the flanges 41, and that include apertures 52 that align with apertures 42 in flanges 41 and that receive the hinge pin 44. The offset position of the hinge pin 44 and axis A1 causes the component 23 and blade 24 to move between an extended use position where the component 23 and blade 24 are generally aligned with the pole 21 (FIGS. 3-4), and to move to the handle-adjacent storage position where the component 23 and blade 24 are adjacent an end of the pole 21 (FIGS. 1-2). Notably, the axis A1 extends a same direction as the sawing plane P1 defined by the blade 24, such that the flanges 41 and 51 and hinge pin 44 provide good strength extending in a direction parallel the sawing plane P1 (defined by the large flat surfaces of the blade 24 as it cuts through a tree branch). The hook 27 and stud 46 also provide good strength extending in a direction parallel the sawing plane P1. The combination of the components 41/44/51 and components 27/46 form a strong torsional support structure within the sawing plane P1, which improves a stability and durability and strength of the present apparatus 20 when used for sawing. Notably, the illustrated axis A1 is located outside of, but near a side surface of the component 23, so that when folded to the storage position, the component 23 is very close to the pole 21, thus providing an optimal and compact arrangement.

Figure 11:
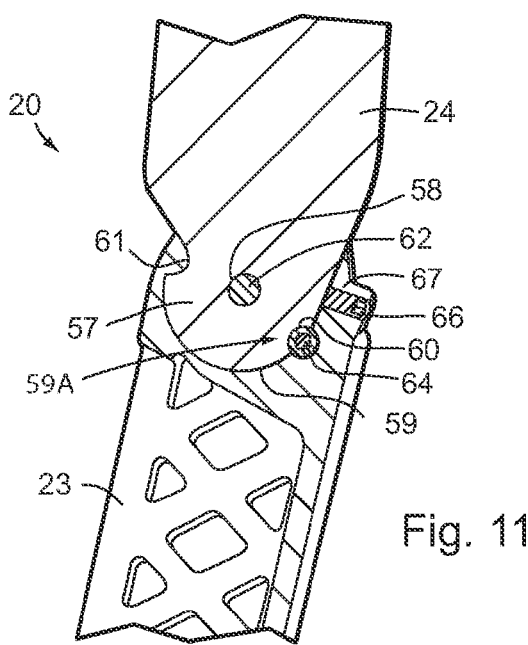
FIG. 11 is a side view of FIG. 7 with portions broken away to show underlying components.

The saw blade 24 (FIGS. 3 and 11) includes a blade end 55 including a cutting edge 56 with teeth, a tip 56A, and a mount end 57 including a pivot hole 58 (FIG. 11) and an arcuate edge 59 extending partially around the pivot hole 58. A detent mechanism 59A (FIG. 11) includes an arcuate edge 59 with two indentations 60 and 61, the first detent 60 holding the blade 24 in its extended us position, and the second detent 61 holding the blade 24 in its storage position. A pivot pin 62 engages the pivot hole 58 and pivotally mount the blade 24 to the blade-holding component 23 for movement between the extended use position (shown in FIGS. 3 and 11) and a handle-adjacent storage position (shown in FIGS. 1-2). A detent pin 64 selectively frictionally engages the indentations 60, 61 to hold the blade 24 in a selected one of the positions relative to the component 23.

It is contemplated that the detent pin 64 can be resilient so that the blade 24 can be moved with enough force to overcome the friction retaining the blade 24 in a selected detent position. Alternatively, it is contemplated that the detent pin 64 can be made to be telescopingly movable within its mounting hole in the component 23 and spring biased, such that the detent pin 64 must be moved/shifted in order to disengage it from the detent indentation 60 (or from indentation 61). For example, a notch (not specifically shown) can be cut into detent pin 64 so that upon being shifted, the notch aligns with the blade 24 to allow the blade 24 to be rotated to a new angular position on the component 23. This later alternative retains the blade 24 in its selected position much more positively than the first alternative.

A set screw 66 (FIG. 11) is threaded into the component 23 at a location where the end of its shaft abuts the edge of the blade 24 at location 67. The set screw 66 is adjustable and can be used to eliminate looseness of the blade 24 relative to the blade-holding component 23 when in the blade 23 is in the expanded use position. This provides increased stability and improved feel to a user, thus providing a better quality feel.

Notably, the folding lock mechanism 26 with hook 27 and pressure pad 28 provide several advantages. The pressure pad 28 is resilient, and slightly compressed when the hook 27 is engaged with the retainer stud 46. Thus, the pressure pad 28 provides a spring biasing force against the hook 27 that helps retain the hook 27 in engagement with the stud 46. Also, an inner surface of the hook end of the hook 27 is made to engage the stud 46 with increasing force as the hook 27 is moved into engagement, such that the hook 27, once engaged, tends to stay frictionally engaged. Also, the pad 28 provides a buffer damping shocks against the blade 23, which further enhances use and function of the present apparatus 20, including its durability and long term use.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A pole saw apparatus comprising:
   a pole with end adapter;
   a blade-holding component pivoted to the end adapter for movement between an extended use position and a handle-adjacent storage position; and a saw blade attached to and supported by the blade-holding component;

wherein the end adapter defines a pivot axis offset from and perpendicular to a longitudinal centerline of the pole;

wherein the saw blade is also pivoted to the blade-holding component for movement between an extended use position and a blade-protected storage position;

wherein the blade-holding component includes a recess for receiving and protecting a cutting edge of the saw blade; and wherein the saw blade includes a tip that extends away from the pole when the blade-holding component and saw blade are in the extended use positions, respectively, but the tip is nearer the pole when the saw blade is pivoted to the storage position.

2. A pole saw apparatus comprising:

a pole with end adapter;

a blade-holding component pivoted to the end adapter for movement between an extended use position and a handle-adjacent storage position; and a saw blade attached to and supported by the blade-holding component;

wherein the end adapter defines a pivot axis offset from and perpendicular to a longitudinal centerline of the pole;

wherein the saw blade is also pivoted to the blade-holding component for movement between an extended use position and a blade-protected storage position; and a retainer for holding the blade-holding component in the extended use position and simultaneously holding the blade-holding component away from the storage position.

3. A pole saw apparatus comprising:

a pole with end adapter;

a blade-holding component pivoted to the end adapter for movement between an extended use position and a handle-adjacent storage position; and a saw blade attached to and supported by the blade-holding component;

wherein the end adapter defines a pivot axis offset from and perpendicular to a longitudinal centerline of the pole;

wherein the saw blade is also pivoted to the blade-holding component for movement between an extended use position and a blade-protected storage position; and a retainer for holding the blade-holding component in the extended use position;

wherein the retainer includes a hook mounted to the end adapter and a pin on the blade-holding component for engaging the hook when the blade-holding component is in the extended use position.

4. The apparatus defined in claim 3, wherein one of the end adapter and blade-holding component includes a resilient pad, and the other of the end adapter and blade-holding component includes an abutting surface engaging the pad when the blade-holding component is in the extended use position.

5. A pole saw apparatus comprising:

a pole with end adapter;

a blade-holding component pivoted to the end adapter for movement between an extended use position and a handle-adjacent storage position; and a saw blade attached to and supported by the blade-holding component and pivotally movable between an extended position and a blade-protected storage position;

wherein the blade-holding component includes a pivot pin supporting the saw blade for rotation, a detent mechanism, and a set screw for abutting the blade to adjustably eliminate looseness of the blade on the pivot pin; the detent mechanism including an arcuate edge on the saw blade defining a first detent for holding the saw blade in the extended position and defining a second detent for holding the saw blade in the blade-protected storage position.

6. A pole saw apparatus comprising:

a handle with end adapter;

a blade-holding component attached to the end adapter and defining a recess; and a saw blade pivoted to and supported by the blade-holding component for movement between a blade use position where a tip of the saw blade extends generally away from the blade-holding component and a blade protected position where the tip is generally adjacent the blade-holding component and in the recess;

wherein the blade-holding component includes the recess for receiving the saw blade when in the blade-protected position, and includes a detent for holding the blade-holding component in the blade-protected position and away from the storage position.

7. A pole saw apparatus comprising:

a handle with end adapter;

a blade-holding component attached to the end adapter and defining a recess; and a saw blade pivoted to and supported by the blade-holding component for movement between a blade use position and a blade protected position in the recess;

wherein the end adapter defines a pivot with pivot axis offset from a centerline defined by the handle; and a locking mechanism for holding the blade-holding component in the extended position, the locking mechanism including a resilient pad on one of the end adapter and the blade-holding component, and a surface of the other of the end adapter and the blade-holding component that abuttingly engage when in the extended use position to generate a resisting force that acts against a retaining force provided by the locking mechanism, thus causing friction to more securely retain the blade-holding component in the extended use position.

8. A pole saw apparatus comprising:

a pole with end adapter;

a blade-holding component pivoted to the end adapter for movement between an extended use position and a handle-adjacent storage position; and a saw blade attached to and supported by the blade-holding component;

a handle on the end adapter, the handle defining a longitudinal centerline and the end adapter including first apertured flanges defining an offset pivot axis;

the blade-holding component including mating flanges pivoted to the apertured flanges on the end adapter for movement between an extended use position and a handle-adjacent storage position; and a locking mechanism including a first part and a second part, the first part being a resilient pad on one of the end adapter and the blade-holding component and a surface of the other of the end adapter and the blade-holding component that engages when in the extended use position, the second part being a hook on one of the end adapter and the blade-holding component, and a hook-engaging pin on the other of the end adapter and blade-holding component that engages when in the extended use position, the resilient pad and the abutting surface providing a resisting force that acts against a retaining force provided by the hook and pin, thus causing friction to more securely retain the blade-holding component in the extended use position.

9. A pole saw apparatus comprising:
a pole with end adapter;
a blade-holding component pivoted to the end adapter for movement between an extended use position and a handle-adjacent storage position; and
a saw blade attached to and supported by the blade-holding component;
wherein the blade-holding component defines a recess; and the saw blade includes a blade end including a cutting edge;
a mount end including a pivot hole and an arcuate edge extending partially around the pivot hole, the arcuate edge including at least one indentation;
a pivot pin engaging the pivot hole and pivotally mounting the blade to the blade-holding component for movement between an extended use position and a handle-adjacent storage position;
a detent engaging the at least one indentation to hold the blade in one of the positions relative to the blade-holding component; and
a set screw threaded into the blade-holding component, the set screw having a shaft end abutting the edge of the blade when in the extended use position, the set screw being adjustable to eliminate looseness of the blade relative to the blade-holding component when in the one position.

10. The apparatus defined in claim 9, wherein the blade-holding component is a cast material that includes threads engaging the set screw.

11. The apparatus defined in claim 10, wherein the blade-holding component includes aperture flanges defining a pivot axis offset from a plane defined by the blade.

\* \* \* \* \*